(12) United States Patent
Morishita

(10) Patent No.: US 11,154,779 B2
(45) Date of Patent: Oct. 26, 2021

(54) PROCESSING DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc.

( * ) Notice: Subject to any disclaimer, the term of this patent is extended or adjusted under 35 U.S.C. 154(b) by 0 days.

(21) Appl. No.: 16/856,076

(22) Filed: Apr. 23, 2020

(65) Prior Publication Data

US 2021/0213357 A1    Jul. 15, 2021

Related U.S. Application Data

(63) Continuation of application No. PCT/JP2020/000411, filed on Jan. 9, 2020.

(51) Int. Cl.
*A63F 13/525* (2014.01)
*A63F 13/537* (2014.01)
*A63F 13/35* (2014.01)

(52) U.S. Cl.
CPC ............ *A63F 13/525* (2014.09); *A63F 13/35* (2014.09); *A63F 13/537* (2014.09)

(58) Field of Classification Search
None
See application file for complete search history.

(56) References Cited

U.S. PATENT DOCUMENTS

| 2003/0038805 | A1 | 2/2003 | Wong et al. |
| 2004/0157662 | A1* | 8/2004 | Tsuchiya ............. A63F 13/5378 463/32 |
| 2004/0224761 | A1* | 11/2004 | Nishimura .............. A63F 13/10 463/33 |
| 2007/0206003 | A1* | 9/2007 | Yoshida .................. G06T 15/00 345/419 |
| 2012/0086631 | A1 | 4/2012 | Osman et al. |
| 2012/0302341 | A1 | 11/2012 | Abe |
| 2020/0211297 | A1* | 7/2020 | Dai ......................... G06F 3/014 |

FOREIGN PATENT DOCUMENTS

| JP | H11-244531 A | 9/1999 |
| JP | 2003-164672 A | 6/2003 |
| JP | 2012-239746 A | 12/2012 |
| JP | 2016-219056 A | 12/2016 |
| JP | 2017-056114 A | 3/2017 |
| JP | 2018-082849 A | 5/2018 |

* cited by examiner

*Primary Examiner* — Ronald Laneau
(74) *Attorney, Agent, or Firm* — Harness, Dickey & Pierce, P.L.C.

(57) ABSTRACT

A processing device includes: an input interface receiving an instruction to operate an operator character object associated with a first virtual camera in a virtual game space in which a player character object is arranged; a memory storing arrangement coordinates of the player character object, the first virtual camera, and the operator character object; and a processor. The processor is configured to execute computer readable instructions to update the arrangement coordinates of the operator character object and the first virtual camera to updated arrangement coordinates when receiving the instruction, virtually image the virtual game space by the first virtual camera arranged at the updated arrangement coordinates, and generate a first virtual image of the virtual game space virtually imaged by the first virtual camera.

20 Claims, 13 Drawing Sheets

FIG. 5A

| USER ID | USER NAME | USER CHARACTER | ATTRIBUTE |
|---|---|---|---|
| U1 | N1 | C1 | OPERATOR |
| U2 | N2 | C2 | PLAYER |
| U3 | N3 | C3 | — |
| U4 | N4 | C4 | — |
| U5 | N5 | C5 | — |
| ... | ... | ... | ... |

FIG. 5B

| OBJECT ID | ARRANGEMENT COORDINATE |
|---|---|
| C1 | (X1,Y1) |
| C2 | (X2,Y2) |
| C3 | (X3,Y3) |
| C4 | (X4,Y4) |
| C5 | (X5,Y5) |
| ... | ... |

PROCESSING DEVICE, PROGRAM, AND METHOD

CROSS-REFERENCE TO RELATED APPLICATIONS

The present application is a continuation application of International Application No. PCT/JP2020/000411, filed on Jan. 9, 2020, which is expressly incorporated herein by reference in its entirety.

BACKGROUND

1. Technical Field

The present disclosure relates to a processing device, a program, and a method for executing a game application that is progressed by utilization of current position information of a player.

2. Related Art

In related art, a system that displays a virtual game, which is progressed in a virtual game space by a player user, in a manner of being viewable by a third party has been known. For example, a system that includes a relay device connected to a plurality of game devices and that performs relay display for a third party by displaying, on the relay device, a captured image that captures a player of each game device and a course map image of a game executed in each game device is described in Japanese Patent Publication No. H11-244531.

SUMMARY

In view of the above-described technology, the present disclosure provides, in various embodiments, a processing device, a program, and a method that enable a user different from a player user to provide a more dynamic virtual image.

According to one aspect of the present disclosure, "a processing device including: an input interface configured to receive, from an operator user, an instruction to operate a first virtual camera to virtually image a virtual game space in which a plurality of objects including a player character object associated with a player user who controls progress of a virtual game is arranged and an operator character object, which is associated with the first virtual camera, in the virtual game space; a memory configured to store arrangement coordinates of each of the player character object, the first virtual camera, and the operator character object in the virtual game space in addition to a predetermined instruction command; and a processor configured to execute the predetermined instruction command stored in the memory in order to arrange the player character object, the first virtual camera, and the operator character object in the virtual game space on the basis of the arrangement coordinates stored in the memory, to update the arrangement coordinates of each of the operator character object and the first virtual camera associated with the operator character object when receiving an instruction related to operation of the operator character object on the input interface, to virtually image the virtual game space by the first virtual camera arranged at the updated arrangement coordinates, and to generate a first virtual image of the virtual game space virtually imaged by the first virtual camera" is provided.

According to one aspect of the present disclosure, "a program causing a computer including an input interface configured to receive, from an operator user, an instruction to operate a first virtual camera to virtually image a virtual game space in which a plurality of objects including a player character object associated with a player user who controls progress of a virtual game is arranged and an operator character object, which is associated with the first virtual camera, in the virtual game space, and a memory configured to store arrangement coordinates of each of the player character object, the first virtual camera, and the operator character object in the virtual game space, to function as a processor configured to perform processing for arranging the player character object, the first virtual camera, and the operator character object in the virtual game space on the basis of the arrangement coordinates stored in the memory, updating the arrangement coordinates of each of the operator character object and the first virtual camera associated with the operator character object when receiving an instruction related to operation of the operator character object on the input interface, virtually imaging the virtual game space by the first virtual camera arranged at the updated arrangement coordinates, and generating a first virtual image of the virtual game space virtually imaged by the first virtual camera" is provided.

According to one aspect of the present disclosure, "a method executed in a computer including an input interface configured to receive, from an operator user, an instruction to operate a first virtual camera to virtually image a virtual game space in which a plurality of objects including a player character object associated with a player user who controls progress of a virtual game is arranged and an operator character object, which is associated with the first virtual camera, in the virtual game space, and a memory configured to store arrangement coordinates of each of the player character object, the first virtual camera, and the operator character object in the virtual game space in addition to a predetermined instruction command, the method being performed by execution of the instruction command with a processor, the method including: a step of arranging the player character object, the first virtual camera, and the operator character object in the virtual game space on the basis of the arrangement coordinates stored in the memory; a step of updating the arrangement coordinates of each of the operator character object and the first virtual camera associated with the operator character object when receiving an instruction related to operation of the operator character object on the input interface; a step of virtually imaging the virtual game space by the first virtual camera arranged at the updated arrangement coordinates; and a step of generating a first virtual image of the virtual game space virtually imaged by the first virtual camera" is provided.

According to various embodiments of the present disclosure, it is possible to provide a processing device, a program, and a method that enable a user different from a player user to provide a more dynamic virtual image.

Note that the above effect is merely an example for convenience of description, and are not limitations. In addition to the above effect or instead of the above effect, any effect described in the present disclosure and an effect that is obvious to those skilled in the art can be acquired.

BRIEF DESCRIPTION OF THE DRAWINGS

FIG. 5A is a view conceptually illustrating a user information table stored in the server device 200 according to the first embodiment of the present disclosure. FIG. 5B is a view conceptually illustrating an object information table stored in the terminal device 100 according to the first embodiment of the present disclosure.

DESCRIPTION OF EXEMPLARY EMBODIMENTS

Figure 1:
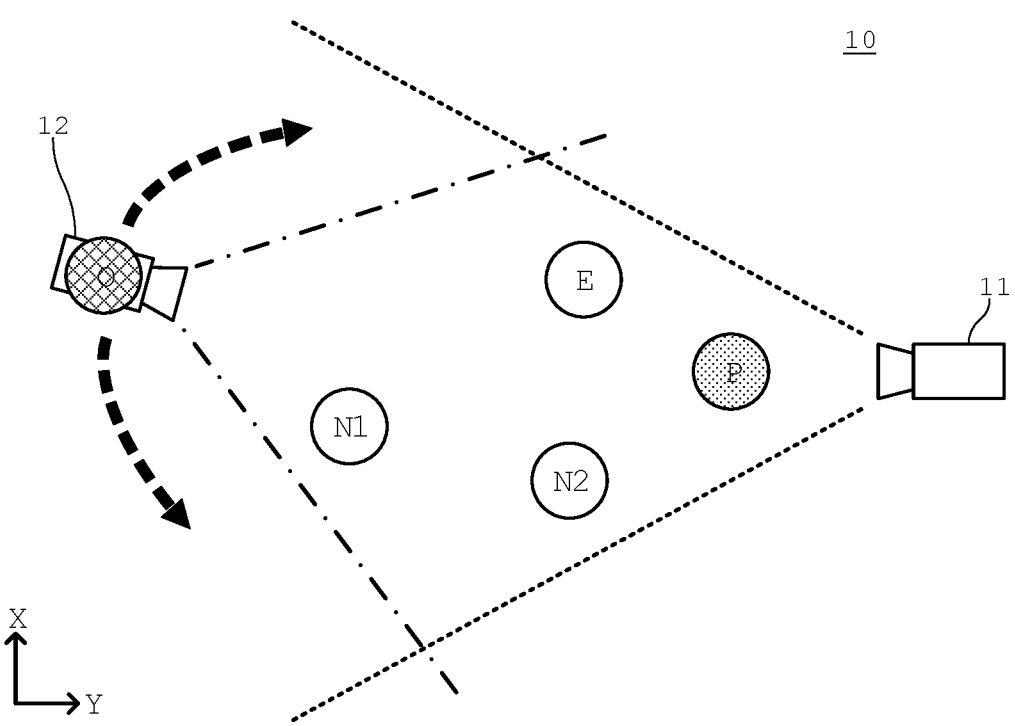
FIG. 1 is a view conceptually illustrating a virtual game space of a game application according to various embodiments of the present disclosure.

Various embodiments of the present disclosure will be described with reference to the attached drawings. Note that the same reference sign is assigned to common components in the drawings.

Outline of Game Application According to Present Disclosure

A game application according to various embodiments of the present disclosure enables execution of a virtual game in which an arrangement position of a player character object is arranged in a virtual game space and a player user controls and progresses an action of the player character object. Then, in this virtual game space, for example, an enemy character object that battles against the player character object, a non-player character object an action of which is controlled by a computer and which battles against the enemy character object in cooperation with the player character object, and the like are arranged in addition to the player character object.

As types of such a game application, there are applications of a combat game, a sports game, a role playing game, and the like between a plurality of character objects including a player character object and one or a plurality of enemy character objects. In the following, although not limited to a specific game application, an outline of an application according to the present embodiment will be described with a combat game application as an example.

FIG. 1 is a view conceptually illustrating a virtual game space of a game application according to various embodiments of the present disclosure. According to FIG. 1, a two-dimensional space extending from a predetermined origin in an X-axis direction and a Y-axis direction is formed as a virtual game space 10. Note that the virtual game space 10 may be formed of a three-dimensional space or the like although a case of being formed of a two-dimensional space will be described in the following.

In the virtual game space 10, a player character object P controlled on the basis of an instruction from a player user, an enemy character object E that battles against the player character object P, and non-player character objects N1 and N2 actions of which are controlled by a computer and which battle against the enemy character object in cooperation with the player character object are arranged at predetermined position coordinates. Also, in order to make it possible for the player user to visually recognize the virtual game space 10, a virtual camera for a player 11 to virtually image the virtual game space 10 and generate a virtual image for a player on a display of a terminal device held by the player user is displayed at predetermined position coordinates in the virtual game space 10.

In the present disclosure, in addition to these, an operator character object O that can move in the virtual game space 10 on the basis of an instruction from an operator user, and a virtual camera for an operator 12 that is virtually held by the operator character object O and that may virtually image a virtual image that may include not only the enemy character object E but also the player character object P are arranged at predetermined position coordinates in the virtual game space 10.

The operator user can freely move the operator character object O in the virtual game space 10 by inputting an instruction via a terminal device held by the operator user. Also, the operator user can freely set a direction, an imaging condition, and the like of the virtual camera for an operator 12 held by the operator character object O by inputting an instruction via the terminal device. A virtual image for a third party by the operator which image is captured in such a manner is distributed to the outside via a communication interface, or output to a display of the terminal device of the operator user, for example.

In such a manner, in the present disclosure, the virtual camera for an operator 12 that can be freely controlled by the operator user is included in addition to the virtual camera for a player 11 that mainly images the player character object P. Thus, in the present disclosure, the operator character object O can move freely in the virtual game space 10 and behave like a photographer that relays a battle between the player character object P and the enemy character object E.

Note that a processing device includes both of a terminal device and a server device in the present disclosure. That is, processing according to each embodiment described in the following can be performed by any of the terminal device and the server device.

Also, the non-player character objects N1 and N2 and the enemy character object E may be arranged or may not be arranged in the virtual game space 10 in the present disclosure.

Also, in the present disclosure, a virtual image for a player is captured by the virtual camera for a player 11. The virtual image may be a so-called "first-person perspective image" in which a field of view of the player character object P is reproduced by arrangement of the virtual camera for a player 11 in positions of eyes of the player character object P, or a "third-person perspective image" in which at least a part of the player character object P is included in the image by arrangement of the virtual camera for a player 11 behind the player character object P. Also, similarly, a virtual image for a third party which image is captured by the virtual camera for an operator 12 may be a first-person perspective image or a third-person perspective image.

Also, in the present disclosure, an image captured by the virtual camera for a player 11 is described as a virtual image for a player, and an image captured by the virtual camera for an operator 12 is described as a virtual image for a third party. However, these are merely described to distinguish the two virtual images, and it is not meant that the virtual image for a player can be viewed only by a player user and the virtual image for a third party can be viewed only by a third-party user other than the player. That is, a virtual image for a player can be also viewed by a user other than a player user, and a virtual image for a third party can be also viewed by a user other than a third-party user.

Also, in the present disclosure, acquiring each virtual image by the virtual camera for a player 11 and the virtual camera for an operator 12 is referred to as "imaging" or "photographing." However, this does not mean that imaging and photographing are actually performed, for example, by a camera provided in a terminal device but means that the virtual game space 10 is virtually imaged and photographed.

Also, in the present disclosure, characters such as the player character object P and the operator character object O, the virtual camera for a player 11 and the virtual camera for an operator 12, and the like can move in the virtual game space 10. However, this "movement" merely means that a relative positional relationship between objects is changed, and specific position coordinates are not necessarily changed. That is, in a case where the player character object P is controlled to move in the virtual game space 10 and become closer to the enemy character object E, position coordinates of the player character object P may be updated to position coordinates close to the enemy character object E, or position coordinates of the enemy character object E may be updated to position coordinates close to the player character object P with the position coordinates of the player character object P as an origin.

Also, an operator user and a player user are described as examples of a user in the present disclosure. However, with respect to the two users, a user who plans to select or selects an operator mode is simply referred to as an operator user, and a user who plans to select or selects a player mode is simply referred to as a player user. That is, the same user can be an operator user or a player user according to selection of a mode.

First Embodiment

Figure 2:
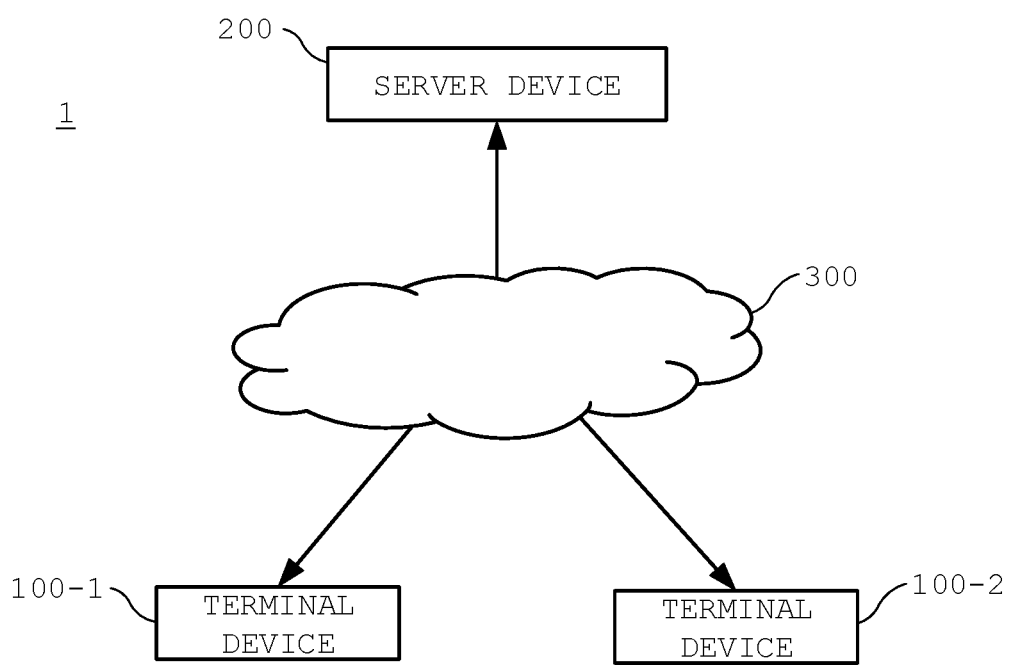
FIG. 2 is a conceptual diagram schematically illustrating a configuration of a system 1 according to a first embodiment of the present disclosure.

1. Configuration of System 1 According to First Embodiment of Present Disclosure FIG. 2 is a conceptual diagram schematically illustrating a configuration of the system 1 according to the first embodiment of the present disclosure. With reference to FIG. 2, the system 1 includes terminal devices 100 (terminal device 100-1 and terminal device 100-2), and a server device 200 communicably connected to the terminal device 100-1 and terminal device 100-2 via a network 300. In the system 1, when the server device 200, the terminal device 100-1, and the terminal device 100-2 execute a program stored in a memory, processing of a game application according to the present embodiment is executed. The server device 200, the terminal device 100-1, and the terminal device 100-2 communicate with each other as needed, and transmit and receive various kinds of information (FIG. 5A and FIG. 5B, for example), a program, and the like necessary for progress of a game application.

Note that three or more terminal devices 100 can be naturally included although only two terminal devices 100 that are the terminal device 100-1 and the terminal device 100-2 are described in the example of FIG. 2. Also, although the server device 200 is described as a single device, components and processing of the server device 200 can be distributed to a plurality of server devices. Furthermore, although being executed by the system 1 including the server device 200 and the terminal devices 100, a game application according to the present embodiment can be also executed by only one terminal device 100 or by a plurality of terminal devices without utilization of the server device 200.

2. Configuration of Terminal Device 100

Figure 3:
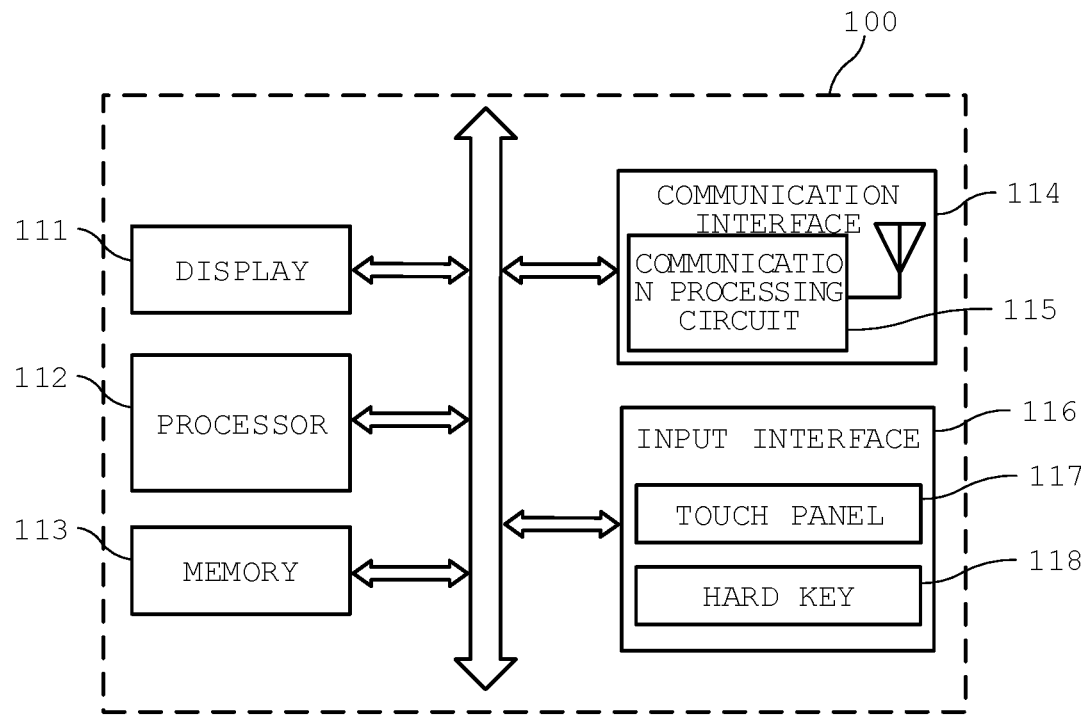
FIG. 3 is a block diagram illustrating an example of a configuration of a terminal device 100 according to the first embodiment of the present disclosure.

FIG. 3 is a block diagram illustrating an example of a configuration of a terminal device 100 (such as terminal device 100-1 or terminal device 100-2) according to the first embodiment of the present disclosure. The terminal device 100 does not need to include all of the components illustrated in FIG. 3, and can have a configuration in which a part is omitted, or a different component can be added.

The terminal device 100 is, for example, a portable terminal device that can perform wireless communication and that is represented by a smartphone. However, in addition, application to any device such as a portable game machine, a feature phone, a personal digital assistant, a PDA, a laptop personal computer, a stationary game machine, or a desktop personal computer can be suitably performed as long as the device can execute the game application according to the present disclosure. Also, the game application according to the present disclosure is executed by a plurality of terminal devices 100 (such as terminal device 100-1 and terminal device 100-2). However, it is not necessary that terminal devices 100 are the same or of the same kind. For example, the terminal device 100-1 may be a smartphone, and the terminal device 100-2 may be a portable game machine.

According to FIG. 3, the terminal device 100 includes a display 111, a processor 112, a memory 113 including a RAM, a ROM, or a non-volatile memory (HDD, in some case), a communication interface 114 including a communication processing circuit 115 and an antenna, and an input interface 116 including a touch panel 117 and a hard key 118. Then, these components are electrically connected to each other via a control line and a data line.

According to an instruction from the processor 112, the display 111 functions as a display unit that reads image information stored in the memory 113 and that performs various displays including a virtual space formed by the game application according to the present embodiment (FIG. 8, FIG. 10, FIG. 11 and FIG. 13, for example). The display 111 includes, for example, a liquid crystal display or an organic EL display.

The input interface 116 includes, for example, the touch panel 117 and/or the hard key 118 and receives various instruction or inputs such as an instruction related to a movement of a player character object from a player user, an instruction related to a movement of an operator character object from an operator user, and an instruction related to a direction of or imaging in a virtual camera for an operator from the operator user. The touch panel 117 is arranged in such a manner as to cover the display 111 and outputs, to the processor 112, information of position coordinates corresponding to image data displayed on the display 111. As a touch panel system, a known method such as a resistive film system, a capacitive coupling system, or an ultrasonic surface acoustic wave system can be used. In the present embodiment, the touch panel 117 detects swipe operation or tap operation on each item, which is displayed on the display 111, by a pointer of the player user or the operator user. Note that although the input interface 116 included in the terminal device 100 is used in the present embodiment, an input interface 116 connected to a main body, which includes a processor 112 and the like, in a wireless or wired manner can be also used.

The processor 112 includes a CPU (microcomputer), and functions as a control unit that controls a connected different component on the basis of various programs stored in the memory 113. More specifically, the processor 112 reads a program for executing the application according to the present embodiment or a program for executing an OS from the memory 113 and executes the program. In the present embodiment, the processor 112 executes processing of arranging a player character object, a virtual camera for an operator, and an operator character object in a virtual game space on the basis of arrangement coordinates stored in the memory 113, processing of updating, when receiving an instruction related to operation of the operator character object in the input interface 116, arrangement coordinates of the operator character object and the virtual camera for an operator which camera is associated with the operator character object, processing of virtually imaging the virtual game space by the virtual camera for an operator which camera is arranged at the updated arrangement coordinates, processing of generating a virtual image for a third party in the virtual game space virtually imaged by the virtual camera for an operator, and the like. Note that the processor 112 may include a single CPU or may include a plurality of CPUs. Also, different kinds of processors such as a GPU specialized in image processing may be arbitrarily combined.

The memory 113 includes a ROM, a RAM, a non-volatile memory, an HDD, or a combination thereof and functions as a storage unit. The ROM stores, as a program, an instruction command for executing the application according to the present embodiment or the OS. The RAM is a memory used for writing and reading of data while the program stored in the ROM is processed by the processor 112. The non-volatile memory is a memory in which data is written and read by execution of the program, and the data written here is stored even after execution of the program is over. In the present embodiment, specifically, the memory 113 stores a program for processing of arranging a player character object, a virtual camera for an operator, and an operator character object in a virtual game space on the basis of arrangement coordinates stored in the memory 113, processing of updating, when receiving an instruction related to operation of the operator character object in the input interface 116, arrangement coordinates of the operator character object and the virtual camera for an operator which camera is associated with the operator character object, processing of virtually imaging the virtual game space by the virtual camera for an operator which camera is arranged at the updated arrangement coordinates, processing of generating a virtual image for a third party in the virtual game space virtually imaged by the virtual camera for an operator, and the like. Also, an object information table (FIG. 5B) is stored in the memory 113 and is updated as needed in response to the processing by the processor 112.

The communication interface 114 functions as a communication unit that transmits/receives information to/from a remotely-installed server device 200 or different terminal device via the communication processing circuit 115 and the antenna. The communication processing circuit 115 performs processing of receiving a program for executing the game application according to the present embodiment, various kinds of information used in the game application, and the like from the server device 200 according to progress of the game application. Also, processing for transmitting a result of the processing by execution of the game application to the server device 200 is performed. Specifically, user ID information and the like are transmitted to the server device 200, and object information and the like are received from the server device 200 in the present embodiment.

The communication processing circuit 115 performs processing on the basis of a wide-band wireless communication system represented by an LTE system, but can perform processing on the basis of a system related to narrow-band wireless communication such as a wireless LAN represented by IEEE 802.11 or Bluetooth (registered trademark). Also, wired communication can be used instead of or in addition to the wireless communication.

3. Configuration of Server Device 200

Figure 4:
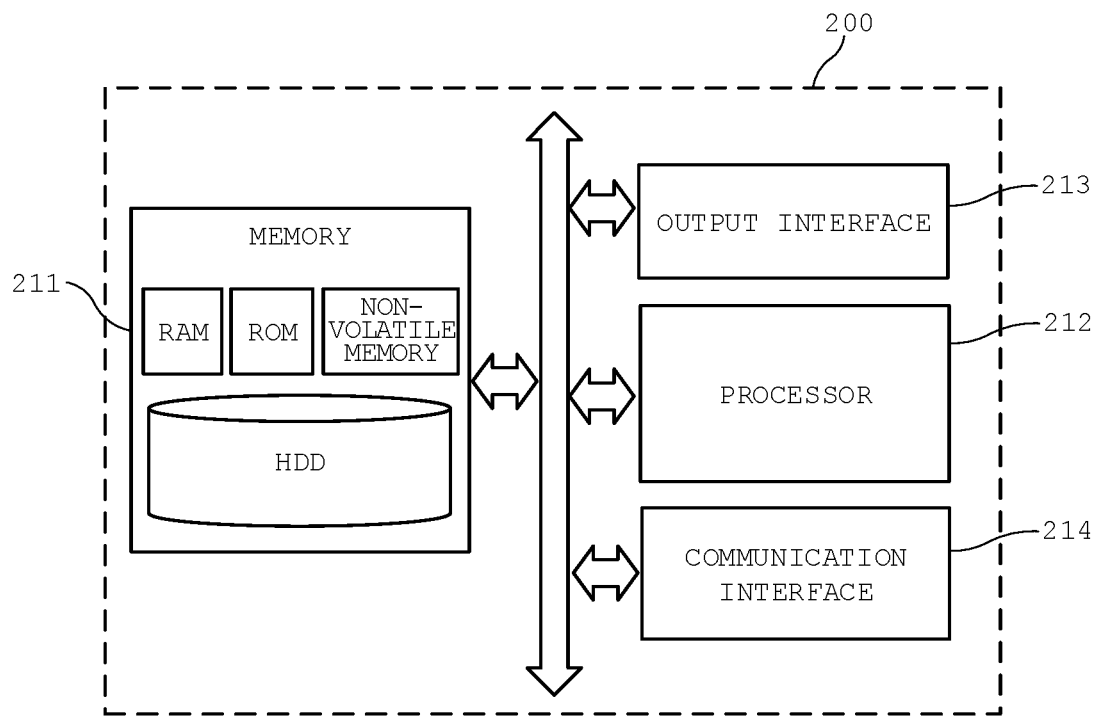
FIG. 4 is a block diagram illustrating an example of a configuration of a server device 200 according to the first embodiment of the present disclosure.

FIG. 4 is a block diagram illustrating an example of a configuration of the server device 200 according to the first embodiment of the present disclosure. The server device 200 does not need to include all of the components illustrated in FIG. 4, and can have a configuration in which a part is omitted, or a different component can be added.

According to FIG. 4, the server device 200 includes a memory 211 including a RAM, a ROM, a non-volatile memory, an HDD, and the like, a processor 212 including a CPU or the like, an output interface 213, and a communication interface 214. Then, these components are electrically connected to each other via a control line and a data line.

The memory 211 includes a RAM, a ROM, a non-volatile memory, an HDD, or a combination thereof and functions as a storage unit. The memory 211 stores, as a program, an instruction command for executing the application according to the present embodiment or the OS. Such a program is loaded and executed by the processor 212. Also, the memory 211 stores a user information table described in FIG. 5A, information of each object arranged in the virtual game space, and the like. Furthermore, the memory 211 (specifically, RAM) is temporarily used for execution of writing and reading of data while the program is executed by the processor 212. In the present embodiment, a program for executing a process of receiving user ID information from each terminal device 100 and performing authentication, processing of receiving an arrangement position of a player character object, an operator character object, or a virtual camera for an operator from each terminal device 100 and performing transmission thereof to a different terminal device 100, processing of receiving a captured virtual image for a third party from a terminal device 100 and performing transmission thereof to a different terminal device, and the like is stored.

Note that a case where a terminal device 100 functions as a processing device will be mainly described in the present embodiment. However, a server device 200 can also function as a processing device. That is, in a case where the server device 200 functions as a processing device, the memory 211 stores a program to execute processing of arranging a player character object, a virtual camera for an operator, and an operator character object in a virtual game space on the basis of arrangement coordinates stored in the memory 211, processing of receiving information when receiving an instruction related to operation of the operator character object on the input interface 116 of the terminal device 100, processing of updating arrangement coordinates of the operator character object and the virtual camera for an operator associated with the operator character object on the basis of the received instruction information, processing of virtually imaging the virtual game space by the virtual camera for an operator arranged at the updated arranging coordinates, and processing of generating a virtual image for a third party in the virtual game space virtually imaged by the virtual camera for an operator, and processing of transmitting the generated virtual image for a third party to the terminal device 100 and/or a different terminal device.

The processor 212 includes a CPU (microcomputer), and functions as a control unit to control a connected different component on the basis of various programs stored in the memory 211. In the present embodiment, specifically, the processor 212 executes process of receiving user ID information from each terminal device 100 and performing authentication, processing of receiving an arrangement position of a player character object, an operator character object, or a virtual camera for an operator from each terminal device 100 and performing transmission thereof to a different terminal device 100, and processing of receiving a captured virtual image for a third party from a terminal device 100 and performing transmission thereof to a different terminal device. The processor 212 may include a single CPU or may include a plurality of CPUs.

Note that a case where a terminal device 100 functions as a processing device will be mainly described in the present embodiment. However, a server device 200 can also function as a processing device. That is, in a case where the server device 200 functions as a processing device, a processor 212 executes processing of arranging a player character object, a virtual camera for an operator, and an operator character object in a virtual game space on the basis of arrangement coordinates stored in a memory 211, processing of receiving information when receiving an instruction related to operation of the operator character object on an input interface 116 of the terminal device 100, processing of updating arrangement coordinates of the operator character object and the virtual camera for an operator, which camera is associated with the operator character object, on the basis of the received instruction information, processing of virtually imaging the virtual game space by the virtual camera for an operator which camera is arranged at the updated arranging coordinates, processing of generating a virtual image for a third party in the virtual game space virtually imaged by the virtual camera for an operator, and processing of transmitting the generated virtual image for a third party to the terminal device 100 and/or a different terminal device.

The communication interface 214 performs processing such as modulation or demodulation to transmit and receive a program, various kinds of information, and the like for execution of the game application according to the present embodiment via the terminal device 100 and the network 300 or via a different server device and the network 300, for example. The communication interface 214 communicates with each terminal device or a different server device according to the above wireless communication system or a known wired communication system. In the present embodiment, specifically, user information and the like are received from the terminal device 100, and character information and the like are transmitted to the terminal device 100.

Although not specifically illustrated, the output interface 213 functions as an information input/output unit to input/output information from/to various external devices such as a printer and a display. As the output interface 213, a known connection format such as a serial port, a parallel port, or a USB can be employed as desired.

4. Information Stored in Each Memory

FIG. 5A is a view conceptually illustrating a user information table stored in the server device 200 according to the first embodiment of the present disclosure. As an example, the user information table is stored in the memory 211 of the server device 200.

According to FIG. 5A, user name information, user character object information, attribute information, and the like are stored in association with user ID information. The "user ID information" is unique information given to each user, and is information to specify each user. The "user name information" indicates a name used by each user in a game application. The "user character object information" is information that specifies a character object that can be controlled on the basis of an instruction input by each user via the input interface 116 or the like in the game application. The "attribute" information is information indicating a game mode of when each user executes a game application. Specifically, an "operator" is stored as an attribute in a case where an operator mode is selected and executed, and a "player" is stored as an attribute in a case where a player mode is selected and executed. When a game application is activated in each terminal device 100, user ID information is transmitted from the terminal device 100. Then, with reference to the user information table, the server device 200 authenticates whether the player is a valid player of the game application on the basis of the received user ID information, and transmits game information such as user character object information necessary for execution of the game application to the terminal device 100 in a case of the valid player.

Note that the memory 211 of the server device 200 also stores an object information table (not illustrated) that receives and stores operation information with respect to each user character object received from each terminal device 100.

FIG. 5B is a view conceptually illustrating an object information table stored in the terminal device 100 according to the first embodiment of the present disclosure. As an example, the object information table is stored in the memory 113 of the terminal device 100.

According to FIG. 5B, the object information table stores arrangement coordinate information and the like in association with object ID information. Note that although not illustrated here, the object information table also stores parameters such as an attribute and a capability value of each object in association with the object ID information. The "object ID information" is unique information given to each object and is information to specify each object. The "arrangement coordinate information" is an example of information indicating an arrangement position in the present embodiment, and is information indicating a coordinate value to determine an arrangement position in a two-dimensional virtual game space. For example, (X1, Y1) are stored as arrangement coordinates of a character object with object ID information "C1" in the virtual game space which object is an operator character object (FIG. 5A). Also, (X2, Y2) are stored as arrangement coordinates of a character object with object ID information "C2" in the virtual game space which object is a player character object (FIG. 5A). Also, although not illustrated in FIG. 5B, arrangement coordinate information of a virtual camera for an operator is also stored. These pieces of arrangement coordinate information are updated and stored as needed according to an instruction input by a user via the input interface 116, information received from the server device 200 via the communication interface 114, or a result of processing by the processor 112.

5. Processing Sequence Performed in System 1

Figure 6:
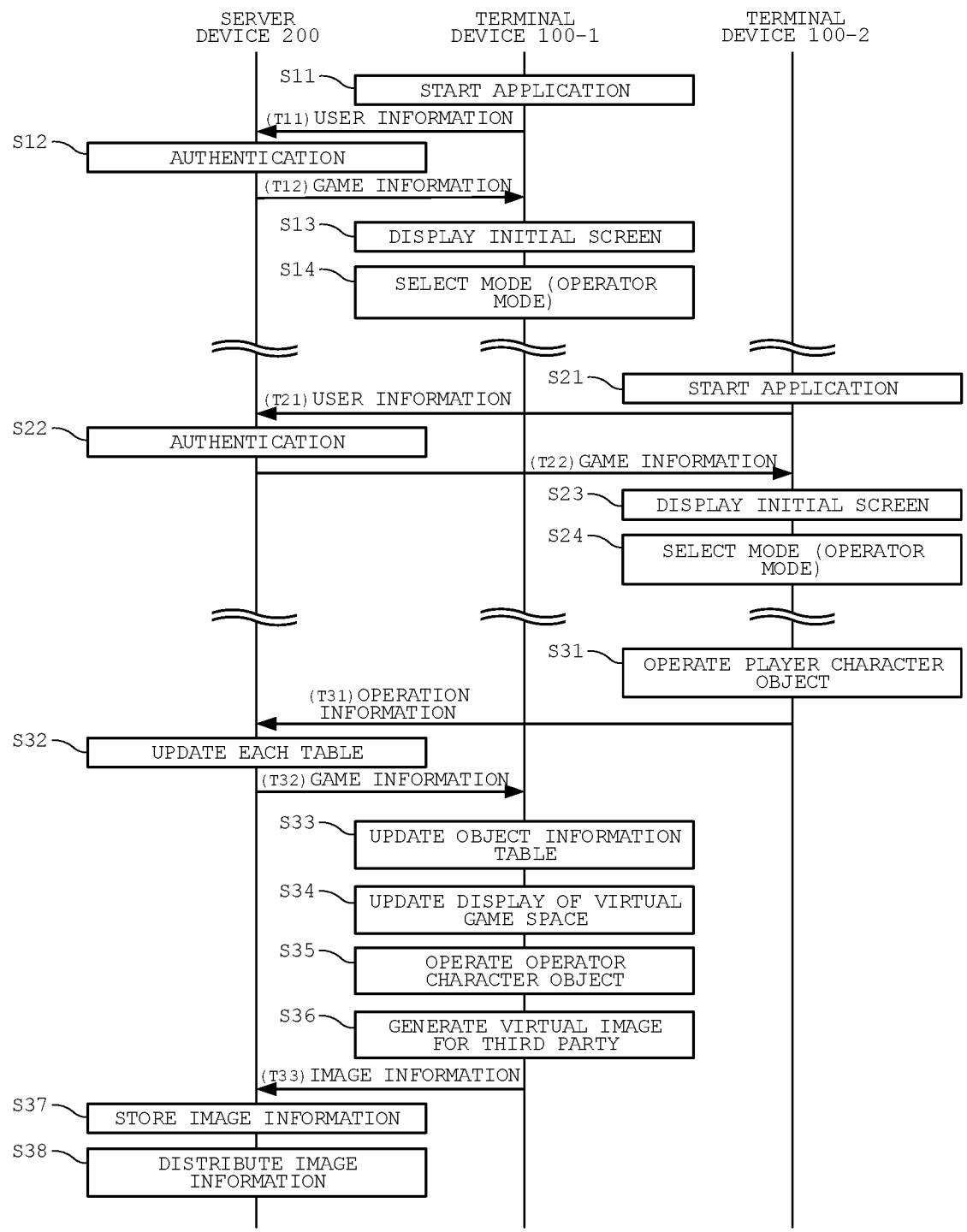
FIG. 6 is a view illustrating a processing sequence executed among the server device 200, a terminal device 100-1, and a terminal device 100-2 according to the first embodiment of the present disclosure.

FIG. 6 is a view illustrating a processing sequence executed among a server device 200, a terminal device 100-1, and a terminal device 100-2 according to the first embodiment of the present disclosure. More specifically, FIG. 6 is a view illustrating a processing sequence performed between the server device 200 and each terminal device 100 in a case where a game application is executed by a user of the terminal device 100-1 in the operator mode and by a user of the terminal device 100-2 in the player mode.

According to FIG. 6, a game application is started when an instruction from an operator user is received in the terminal device 100-1 (S11), and user information (T11) including user ID information or the like of the operator user of the terminal device 100-1 is transmitted to the server device 200. The server device 200 that receives the user information authenticates the user on the basis of the received user ID information (S12), and transmits various kinds of game information (T12) necessary for the game application when authenticating that the user is valid. The terminal device 100-1 that receives the game information displays an initial screen (S13), and selects a stage to be executed, a character object to be used, and the like on the basis of reception of an instruction from the operator user. Next, the terminal device 100-1 displays a mode selection screen (FIG. 8), and selects an operator mode on the basis of reception of an instruction from the operator user (S14). Then, the terminal device 100-1 transmits game information including the selected mode to the server device 200.

On the other hand, a game application is started when an instruction from a player user is received in the terminal device 100-2 (S21), and user information (T21) including user ID information or the like of the user of the terminal device 100-2 is transmitted to the server device 200. The server device 200 that receives the user information authenticates the user on the basis of the received user ID information (S22), and transmits various kinds of game information (T22) necessary for the game application when authenticating that the user is valid. The terminal device 100-2 that receives the game information displays an initial screen (S23), and selects a stage to be executed, a character object to be used, and the like on the basis of reception of an instruction from the player user. Next, the terminal device 100-2 displays a mode selection screen (FIG. 8), and selects a player mode on the basis of reception of an instruction from the player user (S24). Then, the terminal device 100-2 transmits game information including the selected mode to the server device 200.

Note that a case where the game application is started in the terminal device 100-2 after the game application is started in the terminal device 100-1 has been described in FIG. 6. However, any order of starting can be employed.

Next, a virtual game is progressed in the selected stage in the terminal device 100-2. Along with that, the terminal device 100-2 receives an instruction from the player user and a player character object in the virtual game space is operated (S31). As an example of the operation, there are an input of a command such as an arrangement and movement of the player character object or an attack or defense by the player character object, and the like. When receiving an instruction for operation with respect to the player character object, the terminal device 100-2 transmits these pieces of operation information (T31) to the server device 200.

When receiving the operation information, the server device 200 updates each piece of information stored in the memory 211 (S32), and transmits game information (T32) to the terminal device 100-1. The game information includes arrangement coordinates or the like of character objects including the player character object.

When receiving the game information, the terminal device 100-1 updates the object information table on the basis of the arrangement coordinates of the character objects including the player character object included in the game information (S33). On the basis of the updated object information table, the terminal device 100-1 updates a display of the virtual game space in which the player character object and an operator player object are arranged (S34). Subsequently, an instruction from the operator user is received, and the operator character object and a virtual camera for an operator are operated (S35). Then, on the basis of those kinds of operation, the virtual game space is virtually imaged and a virtual image for a third party is generated (S36), and a generated virtual image for a third-party is transmitted as image information (T33) to the server device 200.

The server device 200 stores the received image information (S37) and distributes the virtual image for a third-party to a different terminal device or the like (S38). Note that although not illustrated in FIG. 6, operation information for the operator character object is also transmitted to the terminal device 100-2 via the server device 200.

Figure 7:
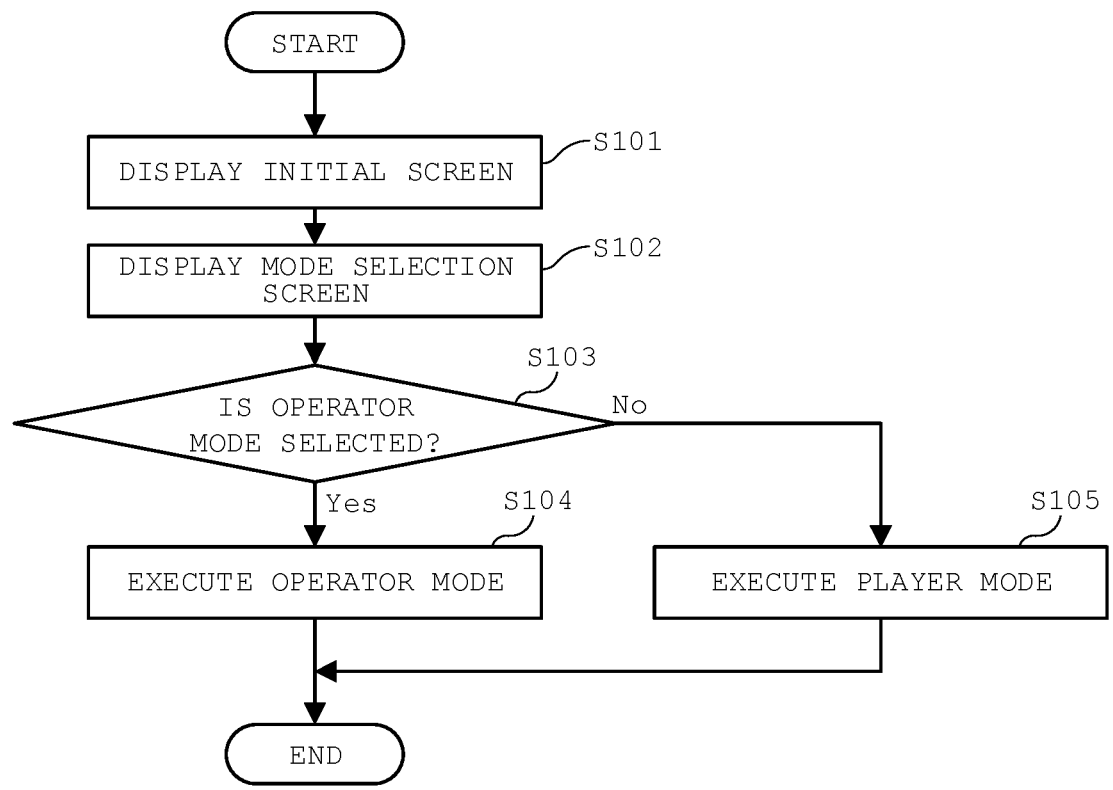
FIG. 7 is a view illustrating a processing flow executed in the terminal device 100 according to the first embodiment of the present disclosure.

6. Processing Flow Performed in Terminal Device 100 Processing Related to Mode Selection FIG. 7 is a view illustrating a processing flow executed in the terminal device 100 according to the first embodiment of the present disclosure. More specifically, FIG. 7 is a view illustrating a processing flow performed after a game application is started in the terminal device 100-1 held by the operator user, authentication is performed in the server device 200, and game information is received. The processing flow is mainly performed by reading and execution of a program, which is stored in the memory 113, by the processor 112 of the terminal device 100-1.

According to FIG. 7, the processor 112 performs control in such a manner as to display an initial screen on the display 111 on the basis of the game information and the like received from the server device 200 (S101). Next, an instruction from the operator user is received in the input interface 116, and the processor 112 displays a mode selection screen on the display 111 after selecting a stage to be executed, a character object to be used, and the like on the basis of the received instruction (S102).

Figure 8:
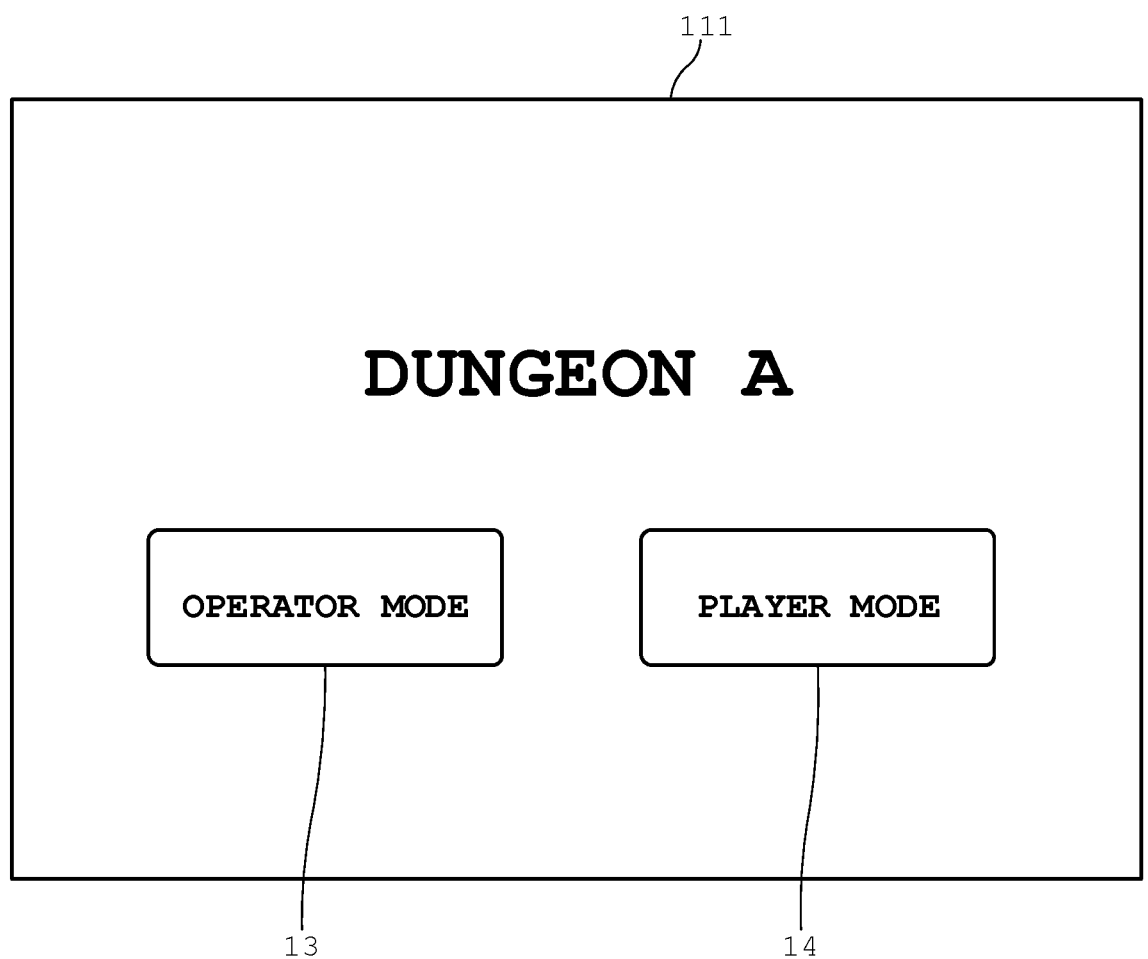
FIG. 8 is a view illustrating an example of a screen displayed on the terminal device 100 according to the first embodiment of the present disclosure.

Here, FIG. 8 is a view illustrating an example of a screen displayed on the terminal device 100 according to the first embodiment of the present disclosure. More specifically, FIG. 8 is a view illustrating an example of a mode selection screen displayed on the display 111. According to FIG. 8, in addition to a stage name (dungeon A) selected by the operator user, an operator mode icon 13 for selection of an operator mode, and a player mode icon 14 for selection of a player mode are displayed on the display 111. A virtual game is progressed in the operator mode when the user selects the operator mode icon 13 via the input interface 116, and the virtual game is progressed in the player mode when the user selects the player mode icon 14.

Referring back to FIG. 7, when receiving an instruction from the user on the mode selection screen illustrated in FIG. 8 again, the processor 112 determines whether the operator mode is selected on the basis of the instruction (S103). Then, the processor 112 executes the virtual game in the operator mode in a case where the operator mode is selected (S104), and executes the virtual game in the player mode in a case where the operator mode is not selected (S105). Subsequently, although not specifically illustrated, the processor 112 transmits information related to the selected mode and the like to the server device 200, and ends a series of processing related to the mode selection.

Processing in Operator Mode

Figure 9:
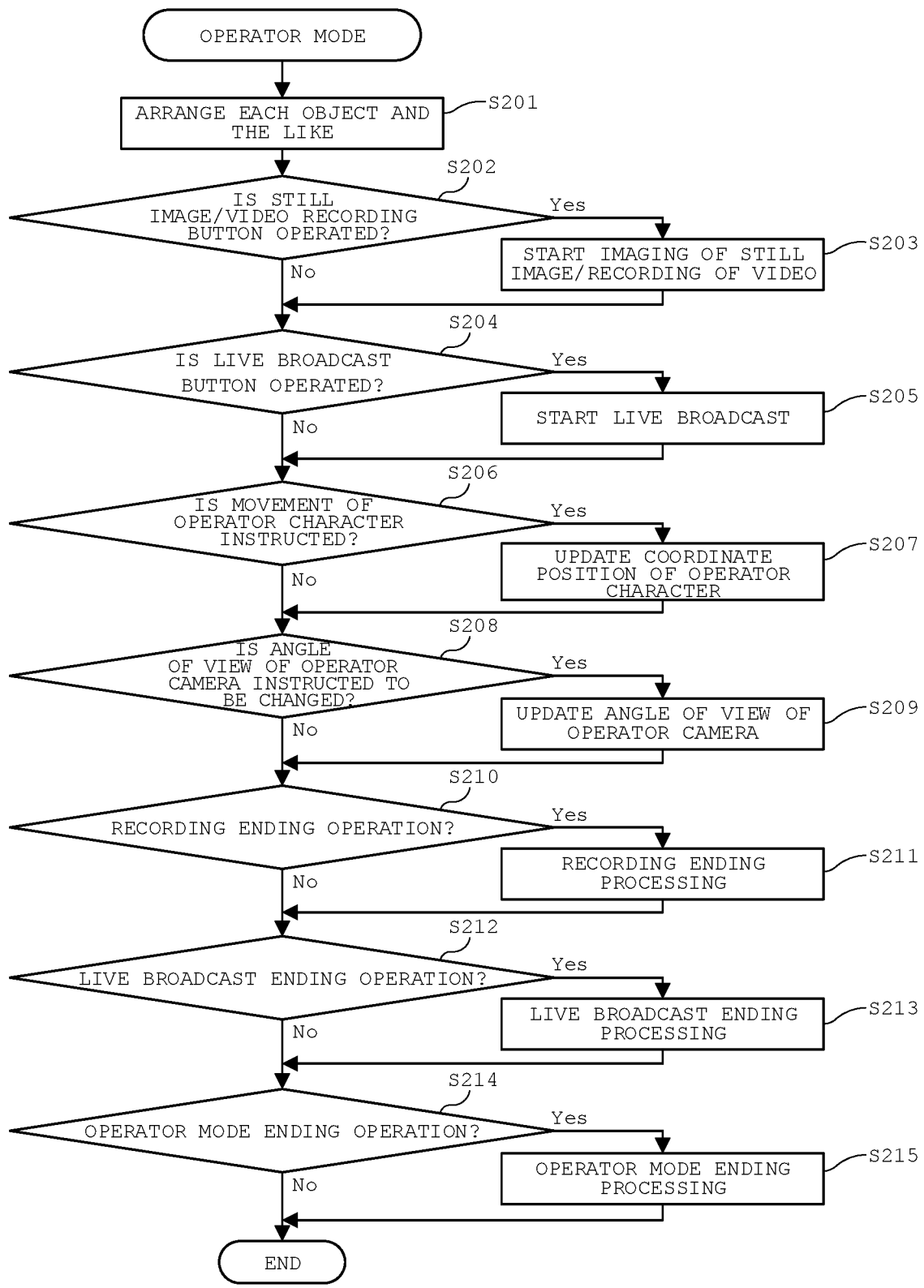
FIG. 9 is a view illustrating a processing flow executed in the terminal device 100 according to the first embodiment of the present disclosure.

FIG. 9 is a view illustrating a processing flow executed in the terminal device 100 according to the first embodiment of the present disclosure. More specifically, FIG. 9 is a view illustrating a processing flow performed when the operator mode is selected in the processing flow illustrated in FIG. 7 and the virtual game is started in the stage selected in the operator mode. The processing flow is mainly performed by reading and execution of a program, which is stored in the memory 113, by the processor 112 of the terminal device 100-1 in a predetermined cycle.

According to FIG. 9, with reference to the object information table and the like in the memory 113, the processor 112 arranges each object, a virtual camera for an operator, and the like in a virtual game space on the basis of arrangement coordinates of a player character object, an operator character object, a virtual camera for an operator, and the like (S201). Then, it is checked whether an interrupt based on detection of an instruction from the operator user with respect to a still image/video recording button is received in the input interface 116 (S202). Then, in a case where the instruction with respect to the still image/video recording button is detected, the processor 112 starts imaging a still image or imaging a moving image in response to the operation (S203).

The system 1 according to the present embodiment distributes the captured still image or moving image to a terminal device 100 of a different user in real time and operates in such a manner as to perform a so-called live broadcast of the executed virtual game. Thus, the processor 112 checks whether an interrupt based on detection of an instruction from the operator user with respect to a live broadcast button is received in the input interface 116 (S204). Then, in a case where an instruction with respect to the live broadcast button is detected, the processor 112 starts imaging a still image or a moving image in a live broadcast mode in response to the operation (S205). More specifically, the processor 112 stores a virtual image for a third party which image is captured by the virtual camera for an operator into the memory 113, and performs transmission thereof to the server device 200 via the communication interface 114 in real time. The server device 200 stores the received virtual image for a third party into the memory 211, notifies a different terminal device of a link of a distribution destination, and distributes the virtual image for a third party to the different terminal device through the link.

Figure 10:
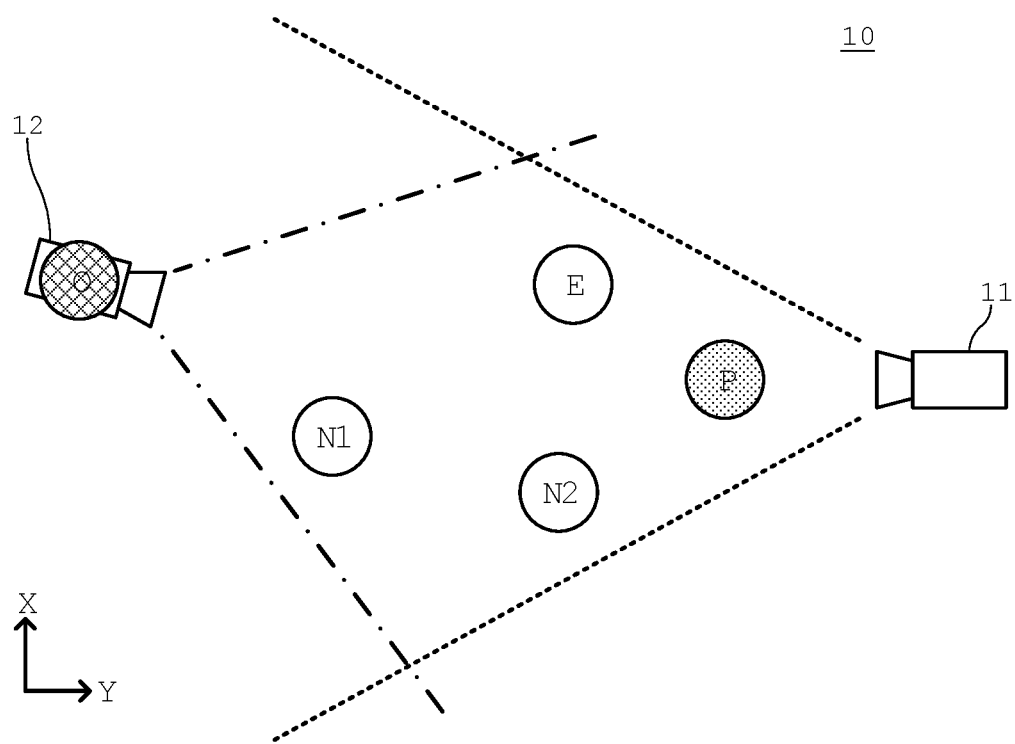
FIG. 10 is a view conceptually illustrating a virtual game space of a game application according to the first embodiment of the present disclosure.

Here, FIG. 10 is a view conceptually illustrating a virtual game space of the game application according to the first embodiment of the present disclosure. More specifically, FIG. 10 is a view conceptually illustrating the virtual game space formed in S201 in FIG. 9. According to FIG. 10, on the basis of position coordinate information stored in the memory 113, a player character object P, an enemy character object E, and non-player character objects N1 and N2 actions of which are controlled by a computer and which battle against the enemy character object in cooperation with the player character object are arranged. Also, similarly, an operator character object O an operation of which is controlled on the basis of a detected instruction from the operator user is arranged on the basis of the position coordinate information stored in the memory 113. Also, on the basis of the position coordinate information stored in the memory 113, a virtual camera for an operator 12 is arranged in a position close to the operator character object O, more preferably, in a superimposed position. Various parameters such as a start or a stop, a direction, a magnification, and a position of imaging are selected on the basis of the detected instruction from the operator user, and the virtual camera for an operator 12 is controlled on the basis of the selected parameters. Furthermore, a virtual camera for a player 11 to capture a virtual image for a player which image can be visually recognized by the player user and is output to progress a virtual game by the player user is also arranged. This arrangement position is arbitrarily controlled depending on which of a first-person perspective image or a third-person perspective image is to be output.

Figure 11:
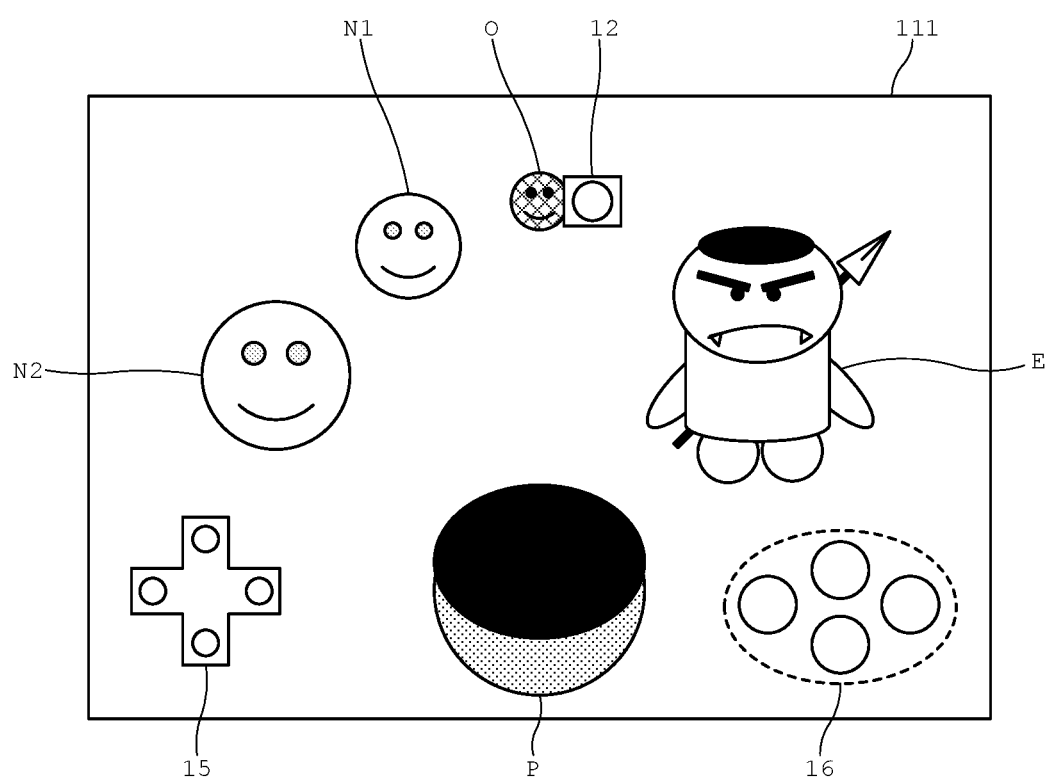
FIG. 11 is a view illustrating an example of a screen displayed on the terminal device 100 according to the first embodiment of the present disclosure.

FIG. 11 is a view illustrating an example of a screen displayed on a terminal device 100 according to the first embodiment of the present disclosure. More specifically, FIG. 11 is a view illustrating an example of a screen displayed on the display 111 when the virtual game is executed in the player mode in the terminal device 100-2. Note that the player mode can be also selected in the terminal device 100-1, and a screen similar to that in FIG. 11 is displayed in a case where the player mode is selected. According to FIG. 11, a virtual image for a player which image is captured by the virtual camera for a player 11 illustrated in FIG. 10 is displayed on the display 111. Here, a third-person perspective image is described as an example. First, the player character object P is displayed on a foreground, and the enemy character object E, the non-player character object N2, and the non-player character object N1 are displayed in this order in a depth direction. Also, since the image is an image captured from the virtual camera for a player, the operator character object O included in an angle of view thereof is also displayed, and the virtual camera for an operator 12 is also displayed at an adjacent position. In addition, since the screen is for the player mode, a cross key object 15 and an operation button object 16 for the player user to input an instruction with respect to the player character object P are displayed. The player user inputs an intended instruction by touching position coordinates on the input interface 116 which coordinates correspond to position coordinates at which the cross key object 15 and the operation button object 16 are displayed.

Figure 12:
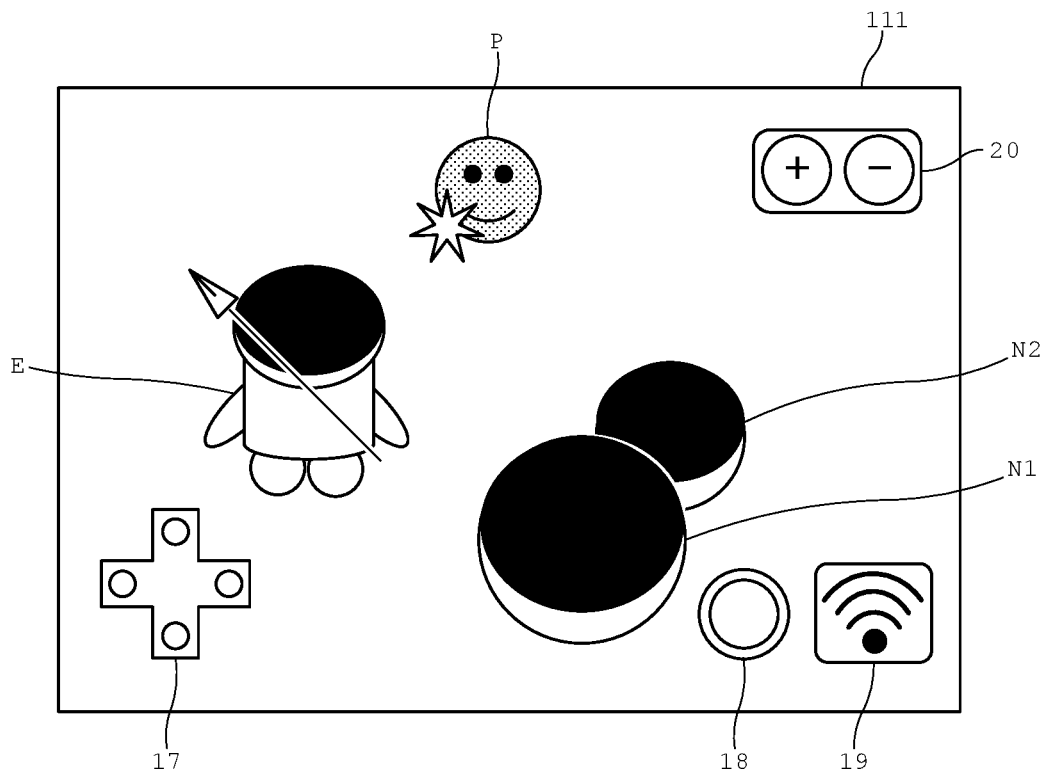
FIG. 12 is a view illustrating an example of a screen displayed on the terminal device 100 according to the first embodiment of the present disclosure.

FIG. 12 is a view illustrating an example of a screen displayed on a terminal device 100 according to the first embodiment of the present disclosure. More specifically, FIG. 12 is a view illustrating an example of a screen displayed on the display 111 when the virtual game is executed in the operator mode in the terminal device 100-1. Note that it is possible to select the operator mode also in the terminal device 100-2, and a screen similar to that in FIG. 12 is displayed in a case where the operator mode is selected. According to FIG. 12, a virtual image for a third party which image is captured by the virtual camera for an operator 12 illustrated in FIG. 10 is displayed on the display 111. Here, according to the virtual game space in FIG. 10, the non-player character object N1, the non-player character object N2, and the enemy character object E are displayed in this order from a position close to the virtual camera for an operator 12. Also, in addition to these, the player character object P placed farthest from the virtual camera for an operator 12 is displayed in a position farthest in the depth direction in the virtual game space. Furthermore, since the screen is for the operator mode, a cross key object 17, a still image/video recording button object 18, a live broadcast button object 19, and a zoom button object 20 for the operator user to input an instruction with respect to the operator character object O and the virtual camera for an operator 12 are displayed. The cross key object 17 is an object to control a movement and a direction of the operator character object O, a movement and a direction of the virtual camera for an operator 12, and the like by a touch on position coordinates on the input interface 116 which coordinates correspond to the coordinate position. Also, the still image/video recording button object 18 is an object for controlling a start or stop of imaging of a still image or recording of a moving image by a touch on position coordinates on the input interface 116 which coordinates to the coordinate position. For example, imaging of a still image is performed by a single touch, and imaging of a moving image is started by a long touch and stopped by a next touch. The live broadcast button object 19 is an object for instructing a live broadcast of a captured virtual image by a touch on position coordinates on the input interface 116 which coordinates correspond to the coordinate position. For example, a start of a live broadcast is instructed by a single touch, and a stop hereof is instructed by a next single touch. The zoom button object 20 is an object for controlling enlargement/reduction of a virtual image for a third party, which image is captured by the virtual camera for an operator 12, by a touch on a coordinate position, which corresponds to the coordinate position, on the input interface 116. For example, enlargement is performed by a continuous touch on a "+" area and reduction is performed by a continuous touch on a "−" area.

Referring back to FIG. 9, the processor 112 detects operation on the cross key object on the input interface 116 by the operator user, and checks whether a movement of the operator character object is instructed (S206). As an example of the operation, an operator user character to be moved is touched via the input interface 116, and then a moving direction and a moving distance thereof are instructed by utilization of the cross key object. Note that it is also possible to instruct position coordinates to be a next destination by dragging a pointer while touching an operator user character object without using the cross key object. Then, according to the instruction input by the operator user, the processor 112 updates and stores position coordinates corresponding to the operator character object stored in the memory 113 (S207).

Here, in the present embodiment, the operator character object can be made to operate as a so-called photographer that moves in a virtual game space and captures a virtual image for a third party. Thus, the operator character object virtually holds a virtual camera for an operator, and it is necessary to move the virtual camera for an operator together with a movement of the operator character object. Thus, when position coordinates of the operator character object are updated, the processor 112 updates position coordinate information of the virtual camera for an operator to position coordinates adjacent to or superimposed on the updated position coordinates. In other words, the position coordinates of the virtual camera for an operator are moved in a direction and for a distance corresponding to a moving direction and a moving distance of the operator character object.

Next, the processor 112 detects operation performed on the cross key object on the input interface 116 by the operator user, and checks whether an instruction to change a direction or the like of the virtual camera for an operator is given (S208). As an example of the operation, a virtual camera for an operator which camera is to be operated is touched via the input interface 116, and a direction of the virtual camera for an operator is subsequently instructed with the cross key object. Note that it is also possible to indicate a direction by dragging a pointer in a desired direction while touching the virtual camera for an operator without using the cross key object. Moreover, here, it is also possible to detect instruction operation on the zoom key object and to adjust a scale of a virtual image for a third party which scale is acquired according to the instruction.

Next, the processor 112 checks whether the input interface 116 receives an interrupt based on an instruction on the live broadcast button by the operator user (S210). More specifically, the processor 112 checks whether live broadcast ending operation is performed on the live broadcast button. Then, in a case where the live broadcast ending operation on the live broadcast button is detected, the processor 112 ends a live broadcast mode in response to the operation (S211). That is, the processor 112 ends a transmission operation with respect to the server device 200 via the communication interface 114 although storing a virtual image for a third party which image is captured by the virtual camera for an operator into the memory 113. As an example of the live broadcast ending operation, there is a single touch on the live broadcast button object via the input interface 116 in a state in which a live broadcast is performed.

Next, the processor 112 checks whether the input interface 116 receives an interrupt based on an instruction on the still image/video recording button by the operator user (S212). More specifically, the processor 112 checks whether recording ending operation is performed with respect to the still image/video recording button. Then, in a case where the recording ending operation is performed, the processor 112 ends recording of a moving image in response to the operation (S213). That is, the processor 112 stops processing of storing a virtual image for a third party which image is imaged by the virtual camera for an operator into the memory 113. As an example of the recording ending operation, there is a single touch on the still image/video recording button in a state in which a moving image is recorded.

Next, the processor 112 checks whether operator mode ending operation is performed by the operator user on the input interface 116 (S214). Examples of the operator mode ending operation include operation on a back key, a touch on an end icon object displayed on a display, and the like. Then, in a case where the operator mode ending operation is detected, returning to an initial screen is performed and the processing flow is ended after an operator mode ending screen or the like is displayed (S215).

On the other hand, in a case where the operator mode ending operation is not detected, the processing flow is ended, and processing is started again from S201 in a next cycle. That is, in the next cycle, the processor 112 arranges the operator character object and the virtual camera for an operator in the virtual game space on the basis of the position coordinates of the operator character object and the virtual camera for an operator which coordinates are updated in the previous cycle (S207), a direction of the virtual camera for an operator, and the like (S201). Then, subsequently, processing similar to the processing performed in the previous cycle is performed, the virtual game space is imaged by the virtual camera for an operator which camera is arranged at the updated position coordinates, and processing such as imaging of a still image, and recording or a live broadcast of a moving image is executed to generate a virtual image for a third party (S203 and S205).

Figure 13:
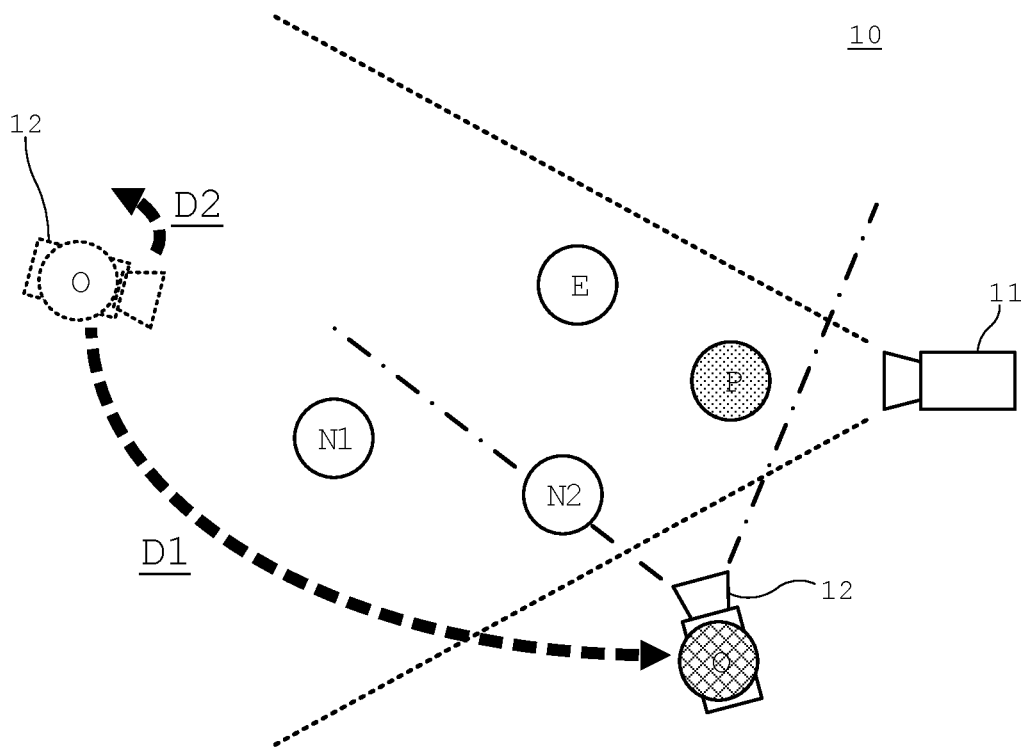
FIG. 13 is a view conceptually illustrating a virtual game space of the game application according to the first embodiment of the present disclosure.

FIG. 13 is a view conceptually illustrating a virtual game space of the game application according to the first embodiment of the present disclosure. More specifically, according to FIG. 13, in the previous cycle of the processing flow in FIG. 9 (S201), the operator character object O is arranged at position coordinates, and the virtual camera for an operator 12 is arranged in a position adjacent to or superimposed on that in a state of facing a direction of the virtual camera for a player 11. Subsequently, on the basis of an instruction from the operator user, the position coordinates of the operator character object O and the position coordinates of the virtual camera for an operator 12 are moved in a direction of D1 and a direction of the virtual camera for an operator is changed to D2 by the processing in S207 and S209. Then, in the next cycle of the processing flow in FIG. 9, the operator character object O and the virtual camera for an operator 12 are arranged at the moved position coordinates in the changed direction (S201). According to FIG. 13, the operator character object O is arranged in the position at position coordinates, and the virtual camera for an operator is moved similarly and is arranged in an adjacent position or a superimposed position thereof. Furthermore, the direction of the virtual camera for an operator 12 is also changed to the direction of D2, that is, a direction of the enemy character object E.

Figure 14:
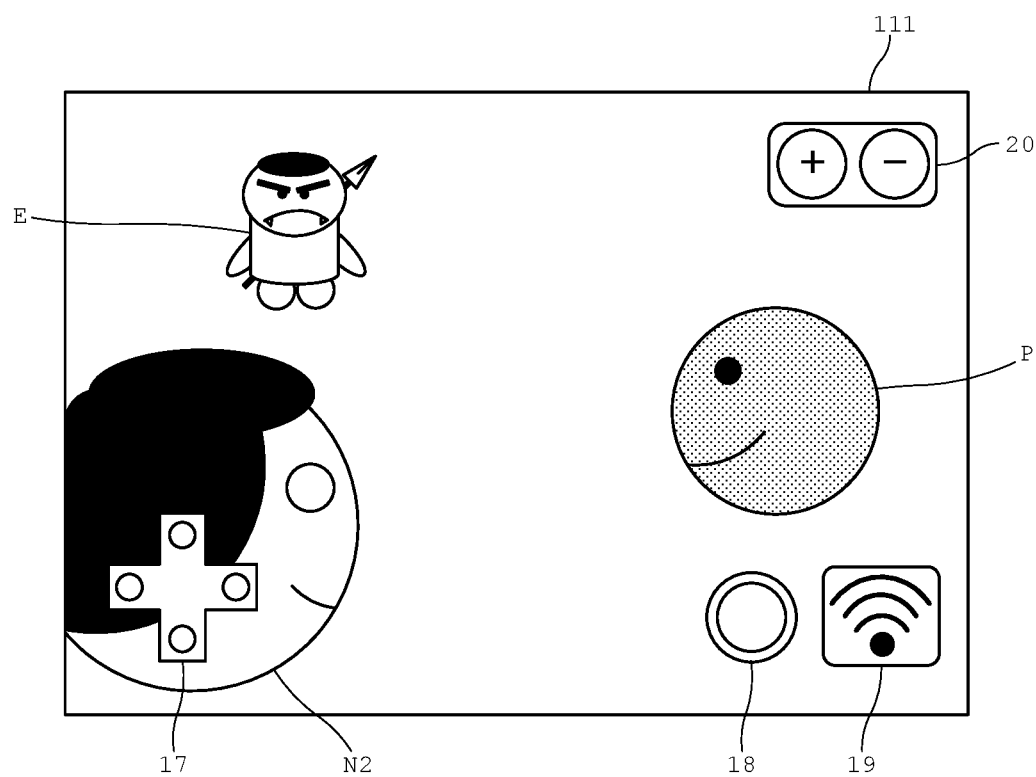
FIG. 14 is a view illustrating an example of a screen displayed on the terminal device 100 according to the first embodiment of the present disclosure.

FIG. 14 is a view illustrating an example of a screen displayed on the terminal device 100 according to the first embodiment of the present disclosure. More specifically, FIG. 14 is a view illustrating an example of a screen displayed on the display 111 when the virtual game is executed in the operator mode in the terminal device 100-1. Note that it is possible to select the operator mode also in the terminal device 100-2, and a screen similar to that in FIG. 14 is displayed in a case where the operator mode is selected. According to FIG. 14, a virtual image for a third party which image is captured by the virtual camera for an operator 12 that is arranged at the moved (updated) position coordinates illustrated in FIG. 13 and is faced to the changed direction is displayed on the display 111. Here, according to the virtual game space in FIG. 13, the non-player character object N2, the player character object P, and the enemy character object E are displayed in this order from a position close to the virtual camera for an operator 12 a position of which is updated and a direction of which is changed. That is, the character object and the like included in the image and a direction thereof are changed as compared to those on the screen in FIG. 12 before the position update and the direction change. Note that with a change in the direction of the virtual camera for an operator in FIG. 14, the non-player character object N1 displayed in FIG. 12 is out of an angle of view thereof (FIG. 13) and is not displayed on the display 111.

Figure 15:
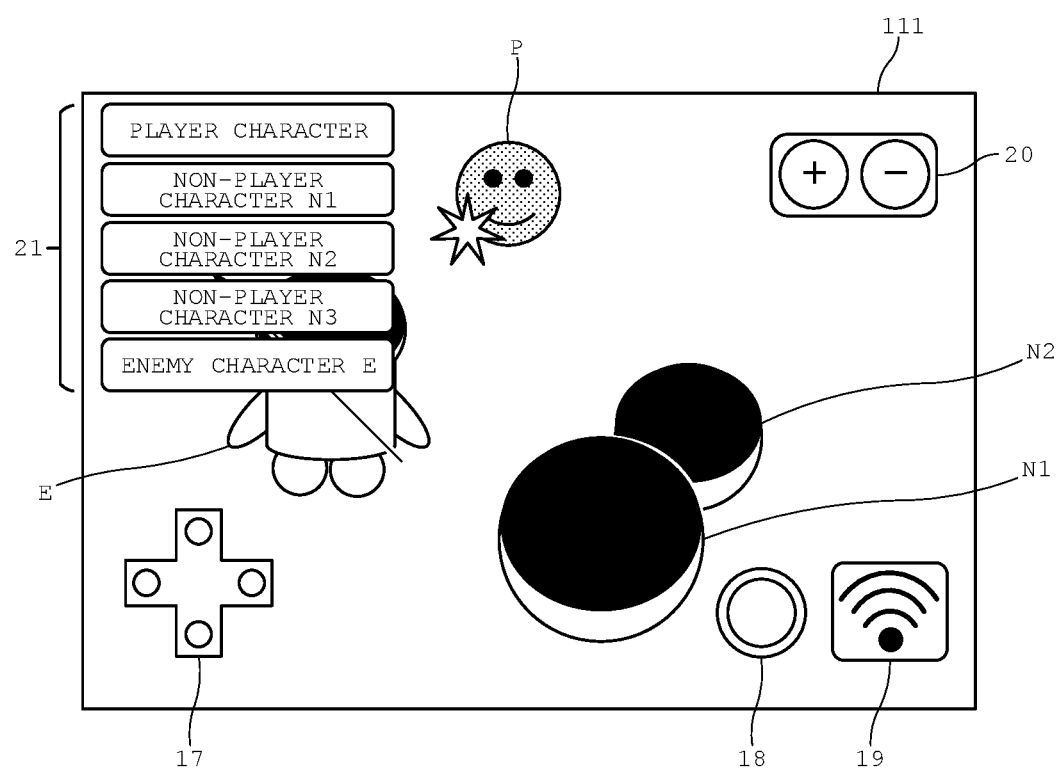
FIG. 15 is a view illustrating an example of a screen displayed on the terminal device 100 according to the first embodiment of the present disclosure.
Figure 16:
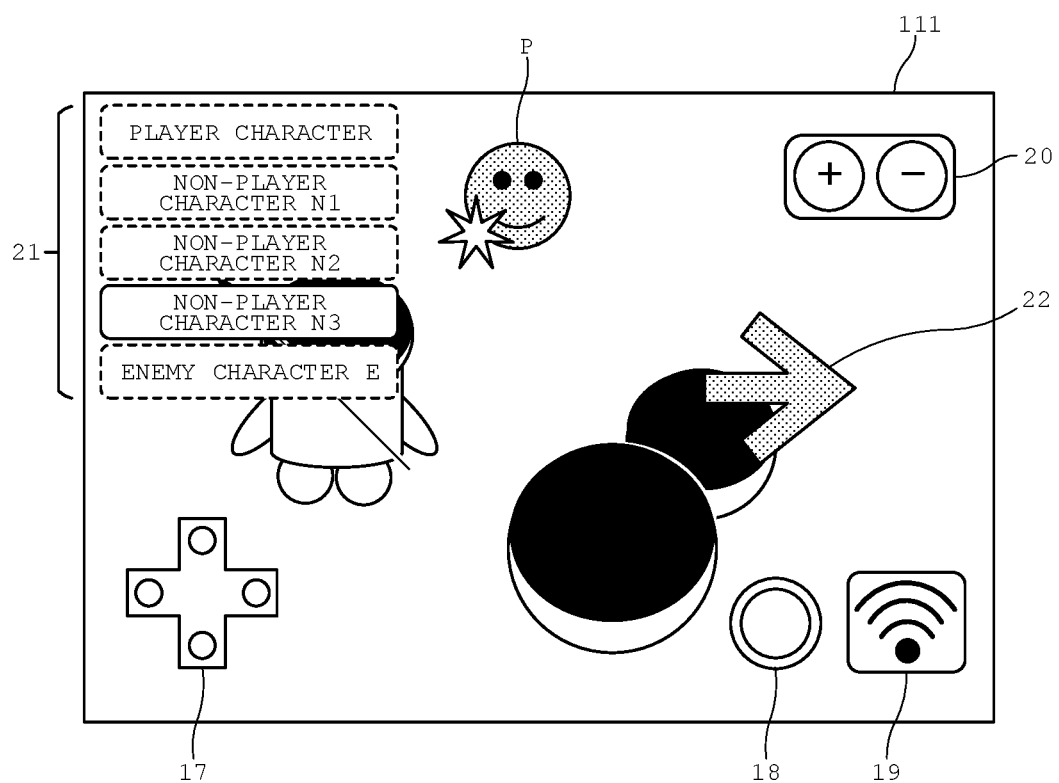
FIG. 16 is a view illustrating an example of a screen displayed on the terminal device 100 according to the first embodiment of the present disclosure.

Here, a movement of the operator character object O is performed as described above in a manner of S206 and S208 in FIG. 9. However, this is not the limitation and a computer may assist the movement. FIG. 15 and FIG. 16 are views illustrating examples of screens displayed on the terminal device 100 according to the first embodiment of the present disclosure. More specifically, FIG. 15 is a view illustrating an example of a screen of a case where the operator mode is selected. According to FIG. 15, a selection tray 21 of character objects included in the virtual game space according to the present embodiment is displayed on an upper left part of the display 111. When receiving selection of each character object included in the selection tray 21 by the operator user, the processor 112 can notify the operator user of a position of the selected character object in the virtual game space.

FIG. 16 is a view illustrating an example of a notification of a position of a selected character object in the virtual game space. According to FIG. 16, in response to selection of a non-player character object N3 in FIG. 15, an arrow 22 that notifies the user of a direction in the virtual game space is displayed on the display 111. This makes it possible for the operator player to know a position of the non-player character object N3 to be imaged, to move in the direction by using the cross key 17 or the like, or to control an angle of view of the virtual camera for an operator in that direction.

Note that although the arrow 22 is displayed in the above example, the operator character object may be automatically moved in a direction of the selected character object, for example. That is, when receiving selection, by the operator player, of a character object to be followed, the processor 112 can also move the operator character object in such a manner as to follow a position of the object. More specifically, every time new position coordinates are set due to a movement of the character object, the processor 112 updates position coordinates of the operator character object to position coordinates separated from the position coordinates for a predetermined distance set previously.

As described above, in the present embodiment, an operator character object different from a player character object is arranged in a virtual game space, and the operator character object can move while holding a virtual camera for an operator and imaging the virtual game space. Thus, it is possible to cause the operator character object to act like a so-called photographer, and it is possible to provide a more dynamic virtual image from various viewpoints according to a movement of the object.

Other Embodiments

In the first embodiment, a case where a virtual image for a third party is a first-person perspective image as viewed from an operator character object has been described. However, similarly to a virtual image for a player, a virtual image for a third party can be also a third-person perspective image when desired.

Also, in the first embodiment, a case where a player character object operated by a player user is arranged in a virtual game space has been described. However, a player user and a player character object do not necessarily exist. For example, in a sports game or the like, it is possible to watch, as an operator user, a battle between teams of non-player characters by controlling a movement of an operator player object or a direction of a virtual camera for an operator.

Also, in the first embodiment, a case where a generated virtual image for a third party is transmitted to a server device 200 and distributed to a different terminal device via the server device 200 has been described. However, this is not a limitation, and it is also possible to directly distribute a generated virtual image for a third party to a different terminal device. Also, it is also possible to display a generated virtual image for a third party on a display 111 of a terminal device 100-1 itself without performing transmission thereof to a server device 200 or a different terminal device. Furthermore, it is also possible to distribute a generated virtual image for a third party to the server device 200 and a different terminal device and to perform a display thereof as a through image on the display 111 of the terminal device 100-1 itself.

Also, in the first embodiment, a case where a virtual image for a third party, which image is captured by a virtual camera for an operator, is transmitted as it is to the server device 200 or a different terminal device has been described. However, this is not a limitation, and transmission may be performed after an operator user or a different user performs various kinds of processing such as editing/processing, or adding text. Also, a display with a virtual image for a player which image is captured by a virtual camera for a player may be performed.

Also, in the first embodiment, control of an operator character object and a virtual camera for an operator has been described. However, in addition to this, a different character object such as a player character object can be affected. For example, a server device 200 may manage a character object selected by an operator player object in a virtual game space (FIG. 14), and may notify a player user of the character object that imaging is performed and give a benefit such as a predetermined item. Also, the server device 200 may manage an angle of view of a virtual camera for an operator, and may notify a player user of a character object included in the angle of view that imaging is performed and give a benefit such as a predetermined item. Furthermore, in a case where there are a plurality of operator players, the server device 200 may manage the number of times of selection or the number of times of imaging by the operator players with respect to each character object, and may give a notification of the number and give a benefit such as a predetermined item according to the number.

As described above, in the above embodiment, it is also possible to acquire an effect similar to the effect described in the first embodiment.

It is also possible to configure a system by arbitrarily combining components described in each embodiment or replacing these.

The processing and procedures described in the present description can be realized not only by what is explicitly described in the embodiments but also by software, hardware, or a combination thereof. More specifically, the processing and procedures described in the present description are realized by implementing a logic corresponding to the processing in a medium such as an integrated circuit, a volatile memory, a non-volatile memory, a magnetic disk, or an optical storage. Also, the processing and procedures described in the present description can be executed by various computers in which these processing and procedures are implemented as a computer program and which includes a terminal device and a server device.

Even when the processing and procedures described in the present description are described to be executed by a single device, software, component, or module, such processing and procedures can be executed by a plurality of devices, a plurality of pieces of software, a plurality of components, and/or a plurality of modules. Also, even when it is described that various kinds of information described in the present description are stored in a single memory or storage unit, such pieces of information can be dispersedly stored in a plurality of memories included in a single device or a plurality of memories dispersedly arranged a plurality of devices. Furthermore, components such as software and hardware described in the present description may be realized by integration thereof into fewer components or breaking thereof into more components.

The processing device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A processing device comprising:
an input interface configured to receive, from an operator user, an instruction to operate an operator character object in a virtual game space which is associated with a first virtual camera, the first virtual camera virtually imaging the virtual game space in which a plurality of objects including a player character object associated with a player user who controls progress of a virtual game is arranged;
a memory configured to store computer readable instructions and arrangement coordinates of the player character object, the first virtual camera, and the operator character object in the virtual game space; and
a processor configured to execute the computer readable instructions so as to:
arrange the player character object, the first virtual camera, and the operator character object in the virtual game space according to the arrangement coordinates stored in the memory;
update the arrangement coordinates of the operator character object and the first virtual camera to updated arrangement coordinates when the input interface receives the instruction to operate the operator character object;
virtually image the virtual game space by the first virtual camera arranged at the updated arrangement coordinates; and
generate a first virtual image of the virtual game space virtually imaged by the first virtual camera.

2. The processing device according to claim 1, wherein the virtual game space has a second virtual camera to virtually image a second virtual image, and the second virtual image is visually recognizable by the player user operating the player character object, and the second virtual image is different from the first virtual image.

3. The processing device according to claim 1, wherein the input interface is configured to receive an instruction to change an imaging direction of the first virtual camera.

4. The processing device according to claim 1, further comprising a display configured to display the first virtual image.

5. The processing device according to claim 1, wherein, when the input interface receives an instruction to store the first virtual image as a still image, the processor is configured to cause the memory to store the first virtual image as the still image.

6. The processing device according to claim 1, wherein, when the input interface receives an instruction to store the first virtual image as a moving image, the processor is configured to cause the memory to store the first virtual image as the moving image.

7. The processing device according to claim 1, further comprising:
a communication interface configured to transmit predetermined information to a server device or another processing device arranged at an outside of the processing device,
wherein the first virtual image is transmitted to the server device or the another processing device via the communication interface.

8. The processing device according to claim 1,
wherein the operator character object and the first virtual camera are arranged adjacent to each other in the virtual game space.

9. A computer program product embodying computer readable instructions stored on a non-transitory computer-readable storage medium for causing a computer to execute a process by a processor, the computer including:
an input interface configured to receive, from an operator user, an instruction to operate an operator character object in a virtual game space which is associated with a first virtual camera, the first virtual camera virtually imaging the virtual game space in which a plurality of objects including a player character object associated with a player user who controls progress of a virtual game is arranged; and
a memory configured to store arrangement coordinates of the player character object, the first virtual camera, and the operator character object in the virtual game space,
the computer configured to perform the steps of:
arranging the player character object, the first virtual camera, and the operator character object in the virtual game space according to the arrangement coordinates stored in the memory;
updating the arrangement coordinates of the operator character object and the first virtual camera to updated arrangement coordinates when the input interface receives the instruction to operate the operator character object;
virtually imaging the virtual game space by the first virtual camera arranged at the updated arrangement coordinates; and
generating a first virtual image of the virtual game space virtually imaged by the first virtual camera.

10. The computer program product according to claim 9, wherein the virtual game space has a second virtual camera to virtually image a second virtual image, and the second virtual image is visually recognizable by the player user operating the player character object, and the second virtual image is different from the first virtual image.

11. The computer program product according to claim 9, wherein the input interface is configured to receive an instruction to change an imaging direction of the first virtual camera.

12. The computer program product according to claim 9, wherein, when the input interface receives an instruction to store the first virtual image as a still image, the processor is configured to cause the memory to store the first virtual image as the still image.

13. The computer program product according to claim 9, wherein, when the input interface receives an instruction to store the first virtual image as a moving image, the processor is configured to cause the memory to store the first virtual image as the moving image.

14. The computer program product according to claim 9, wherein the operator character object and the first virtual camera are arranged adjacent to each other in the virtual game space.

15. A method for causing a processor in a computer to execute a process, the computer including:
an input interface configured to receive, from an operator user, an instruction to operate an operator character object in a virtual game space which is associated with a first virtual camera, the first virtual camera virtually imaging the virtual game space in which a plurality of objects including a player character object associated with a player user who controls progress of a virtual game is arranged; and
a memory configured to store non-transitory computer readable instructions and arrangement coordinates of the player character object, the first virtual camera, and the operator character object in the virtual game space,
the method comprising executing the non-transitory computer readable instructions on the processor the steps of:
arranging the player character object, the first virtual camera, and the operator character object in the virtual game space according to the arrangement coordinates stored in the memory;
updating the arrangement coordinates of the operator character object and the first virtual camera to updated arrangement coordinates when the input interface receives the instruction to operate the operator character object;
virtually imaging the virtual game space by the first virtual camera arranged at the updated arrangement coordinates; and
generating a first virtual image of the virtual game space virtually imaged by the first virtual camera.

16. The method according to claim 15,
wherein the virtual game space has a second virtual camera to virtually image a second virtual image, and the second virtual image is visually recognizable by the player user operating the player character object, and the second virtual image is different from the first virtual image.

17. The method according to claim 15,
wherein the input interface is configured to receive an instruction to change an imaging direction of the first virtual camera.

18. The method according to claim 15,
wherein, when the input interface receives an instruction to store the first virtual image as a still image, the processor is configured to cause the memory to store the first virtual image as the still image.

19. The method according to claim 15,
wherein, when the input interface receives an instruction to store the first virtual image as a moving image, the processor is configured to cause the memory to store the first virtual image as the moving image.

20. The method according to claim 15,
wherein the operator character object and the first virtual camera are arranged adjacent to each other in the virtual game space.

* * * * *